United States Patent
Jun

(10) Patent No.: US 7,576,938 B2
(45) Date of Patent: Aug. 18, 2009

(54) HARD DISK DRIVE, METHOD FOR CONTROLLING FOD VOLTAGE THEREOF, AND COMPUTER READABLE RECORDING MEDIUM RECORDING THE METHOD

(75) Inventor: Jin-Wan Jun, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 11/790,147

(22) Filed: Apr. 24, 2007

(65) Prior Publication Data

US 2007/0258164 A1 Nov. 8, 2007

(30) Foreign Application Priority Data

May 2, 2006 (KR) ............ 10-2006-0039446

(51) Int. Cl.
G11B 21/02 (2006.01)
G11B 19/04 (2006.01)

(52) U.S. Cl. .................... 360/75; 360/60

(58) Field of Classification Search .......... None
See application file for complete search history.

(56) References Cited

U.S. PATENT DOCUMENTS

| 7,224,547 | B2* | 5/2007 | Suk ............ 360/75 |
| 2007/0230021 | A1* | 10/2007 | Schreck et al. ........ 360/75 |
| 2008/0019032 | A1* | 1/2008 | Hayakawa et al. ........ 360/75 |

FOREIGN PATENT DOCUMENTS

| JP | 09-044979 | 2/1997 |
| JP | 09-091911 | 4/1997 |
| JP | 2003-346445 | 12/2003 |
| KR | 100255641 B1 | 2/2000 |

* cited by examiner

Primary Examiner—Andrew L Sniezek
(74) Attorney, Agent, or Firm—Volentine & Whitt, P.L.L.C.

(57) ABSTRACT

A flying on demand (FOD) voltage of a hard disk drive (HDD) is controlled by detecting a shock occurring to the HDD on which a magnetic head that records data on a disk or reproduces data from the disk is mounted, and if the shock is detected, controlling the FOD voltage that is applied to the magnetic head to thermally expand an end of the magnetic head.

15 Claims, 3 Drawing Sheets

HARD DISK DRIVE, METHOD FOR CONTROLLING FOD VOLTAGE THEREOF, AND COMPUTER READABLE RECORDING MEDIUM RECORDING THE METHOD

BACKGROUND OF THE INVENTION

1. Field of the Invention

The present invention relates to a hard disk drive (HDD), a method for controlling a Flying On Demand (FOD) voltage within the HDD, and a computer readable recording medium recording the method. More particularly, the invention relates to a HDD, a FOD voltage control method, and related computer readable recording medium in which the HDD includes a magnetic head having improved recording and reproduction capabilities which simultaneously prevent damage to the magnetic head and/or a disk within the HDD when a shock is applied to the HDD.

This application claims the priority of Korean Patent Application No. 10-2006-0039446, filed on 2 May 2006, the subject matter of which is hereby incorporated by reference.

2. Description of Related Art

Hard disk drives (HDDs) include a collection of electronic and mechanical parts. HDDs function as memory devices adapted to record and reproduce data by converting digital electrical pulses to/from corresponding magnetic field impulses. HDDs provide permanent data storage on one or more disks containing a plurality of defined data "tracks". HDDs are widely used as auxiliary memory devices in computer systems because of their ability to rapidly access large amounts of stored data.

With recent increases in track per inch (TPI) data storage density, as defined by a direction around the rotational axis of a disk, and bits per inch (BPI) data storage density, as defined by a direction across the thickness of a disk, contemporary HDDs are able to achieve very high capacity data storage with relatively small size. However, as the data storage capacity has increased while the size of contemporary and emerging HDD has actually decreased, the flying height (FH) for a constituent magnetic head—that is, the height at which the magnetic head floats above the disk surface—must be reduced to maintain or improve the recording and reproduction capability of the HDD.

Unfortunately, as the FH for a magnetic head decreases, the likelihood of impact or collision between the magnetic head and the disk surface increases. This is particularly true when the HDD is subjected to an externally applied impact or shock. Under such circumstances, the risk of damage to the magnetic head and/or disk is very great.

SUMMARY OF THE INVENTION

Embodiments of the invention provide a hard disk drive (HDD) having improved recording and reproduction capabilities associated with a magnetic head and yet simultaneously inhibit damage to the magnetic head and/or a disk surface in relation to an externally applied shock. Embodiments of the invention also provide a related a method for controlling an FOD voltage within the HDD and a computer readable recording medium recording the method.

In one embodiment, the invention provides a method for controlling a Flying On Demand (FOD) voltage within a hard disk drive (HDD) comprising a disk and a magnetic head that records data on or reproduces data from the disk, the method comprising; detecting a shock applied to the HDD, and upon detecting the shock, controlling the FOD voltage applied to the magnetic head to thermally expand one end of the magnetic head.

In another embodiment, the invention provides a computer readable recording medium recording a method for controlling a Flying On Demand (FOD) voltage within a hard disk drive (HDD), the HDD comprising a disk and a magnetic head that records data on or reproduces data from the disk, and the method comprises; detecting a shock applied to the HDD, and upon detecting the shock, controlling the FOD voltage applied to the magnetic head to thermally expand one end of the magnetic head.

In another embodiment, the invention provides a hard disk drive (HDD) comprising; at least one disk, a magnetic head recording data on the disk or reproducing data from the disk and having one end that thermally expands in relation to an applied Flying On Demand (FOD) voltage, a shock sensor detecting an external shock applied to the HDD, and a controller controlling the FOD voltage in response to a detected shock.

In another embodiment, the invention provides a hard disk drive (HDD), comprising; at least one disk, a magnetic head recording data on the disk or reproducing data from the disk and having one end that thermally expands as a Flying On Demand (FOD) voltage is applied, a shock sensor detecting an external shock applied to the HDD, a controller generating a signal for removing the FOD voltage when the shock sensor detects the shock, and a pre-amplifier receiving the signal for removing the FOD voltage from the controller and removing the FOD voltage applied to the magnetic head.

BRIEF DESCRIPTION OF THE DRAWINGS

The above and/or other aspects and advantages of the present invention will become apparent and more readily appreciated from the following detailed description, taken in conjunction with the accompanying drawings of which.

Figure (FIG.) 1 is an exploded perspective view showing the structure of a hard disk drive according to an embodiment of the present invention.

DESCRIPTION OF EMBODIMENTS

Figure 1:
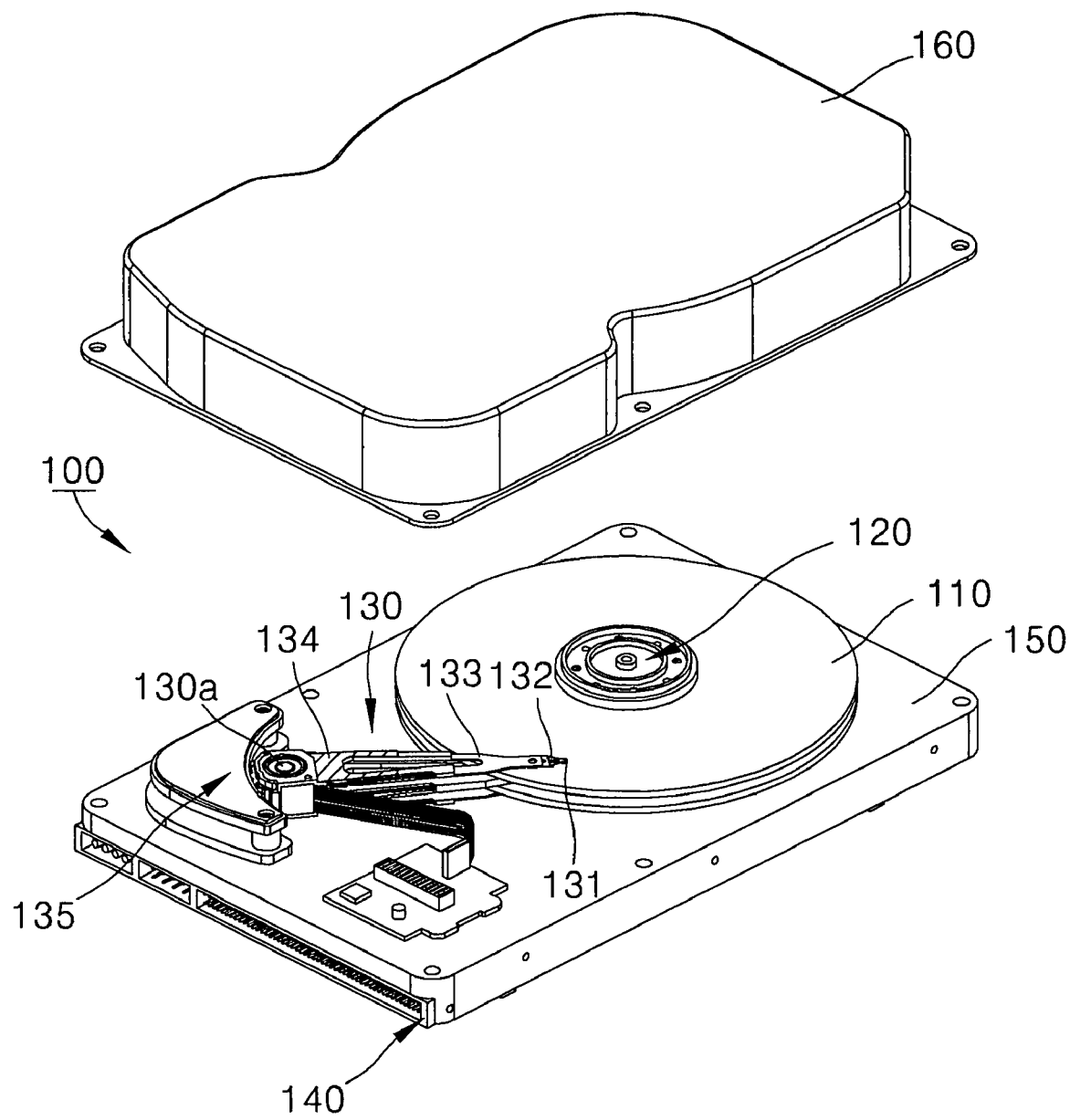

Reference will now be made to embodiments of the invention, examples of which are illustrated in the accompanying drawings, wherein like reference numerals refer to the like elements throughout. The embodiments are described below in order to explain the present invention by referring to the figures.

Figure 2:
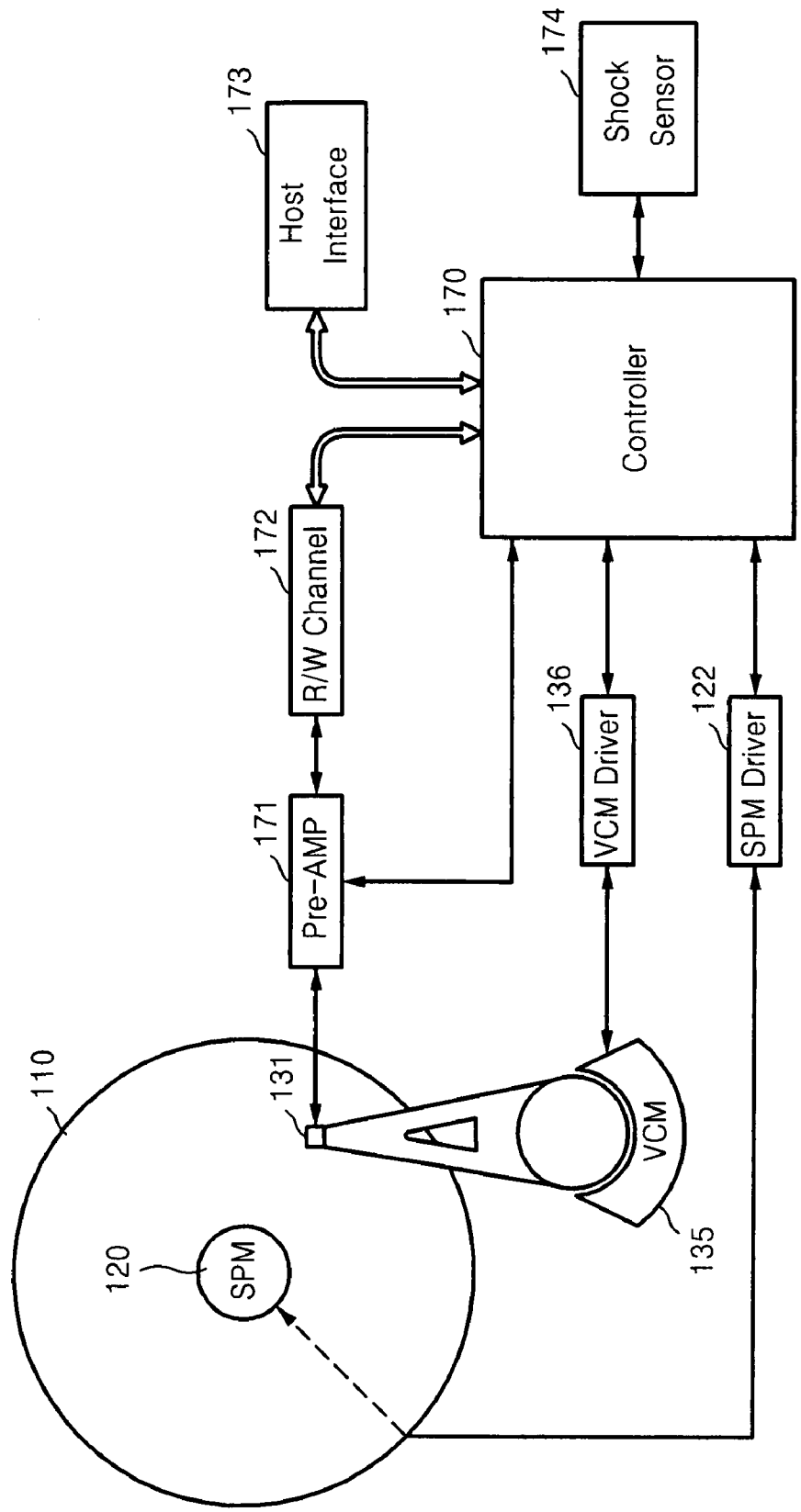
FIG. 2 is a block diagram of a drive circuit of the hard disk drive of FIG. 1.

FIG. 1 is an exploded perspective view showing the structure of a hard disk drive according to an embodiment of the present invention. FIG. 2 is a block diagram of a drive circuit of the hard disk drive of FIG. 1.

Referring to FIGS. 1 and 2, a hard disk drive (HDD) 100 according to an embodiment of the invention includes at least one disk 110 for recording data, a spindle motor (SPM) 120 for rotating the disk 110, a head stack assembly (HSA) 130 pivoting around a pivot shaft 130a to move across the disk 110, a printed circuit board assembly (PCBA) 140 for electrically controlling the HDD 100 and having a printed circuit board (PCB) on which most circuit parts, in particular, a controller 170 which will be described later, are installed, a base 150 on which the above constituent parts are assembled, and a cover 160 covering the upper side of the base 150 and forming a seal to protect the constituent parts from outside dust and foreign materials.

One or more disks may be provided as the disk 110. When a plurality of disks are provided as the disk 110, the plurality of disks are separated a predetermined distance from one another to be deposited above the base 150. Both sides of the disk 110 are coated with a magnetic material of a thin film where data is stored. The magnetic material is coated on a surface of the disk 110 in a method such as electric plating, sputtering, chemical vapor deposition, or physical vapor deposition.

The disk 110 typically includes a large number of tracks formed of a plurality of concentric circles, actually several hundred thousands of tracks. Each track has a plurality of data sectors and each data sector can record a defined number of data bytes (e.g., 512 Bytes). The data sector consists of a sector header including the address information of a data sector, a data section where data is actually recorded, and an error correction code (ECC) to correct fine errors of the data.

As examples, the size of the disk 110 may be 1.0", 1.8", 2.5", 3.5", 5.25", 8", 14", etc. The material forming the disk 110 may be an aluminum alloy, glass, a glass composition, and a magnesium alloy, etc.

The spindle motor 120 is coupled to the disk 110 and rotates the disk 110 in response to a control signal of a controller 170 which will be described later. The rotational angular speed of the spindle motor 120 may be, for example, 3,600 rpm, 5,400 rpm, 7,200 rpm, and 10,000 rpm.

The HSA 130 pivots around a pivot shaft 130a to move a magnetic head 131 to a desired position on the disk 110. The HSA 130 includes the magnetic head 131 recording or reproducing data with respect to the disk 110, a slider 132 having the magnetic head mounted thereof and allowing the magnetic head 131 to float above the disk 110, a suspension 133 elastically supporting the slider 132 toward the surface of the disk 110, an actuator arm 134 coupled to the pivot shaft 130a capable of pivoting and extending so that the magnetic head 131 reaches the disk 110, and an actuator 135 rotating the actuator arm 134.

The magnetic head 131 can reproduce data from the disk 110 by detecting a magnetic field formed on the surface of the disk 110 or record data on the disk 110 by magnetizing the surface of the disk 110. Although a single magnetic head is illustrated as the magnetic head 131 in FIG. 2, the magnetic head 131 may be provided as a recording head to magnetize the disk 110 and a reproducing head to detect the magnetic field of the disk 110.

The magnetic head 131 may be arranged to float a predetermined distance from each of both sides of the disk 110 stacked above the base 150. For example, when the number of the disk 110 is six, twelve of the magnetic heads 131 may be arranged to float above both sides of each of the disks 110.

The magnetic head 131 reproduces data from the disk 110 or records data on the surface of the disk 110 in a state of floating above the surface of the disk 110 as high as the flying height (FH). When a high tracks per inch (TPI) and a high bits per inch (BPI) are required in the manufacturing design of a high capacity HDD, the width of each track decreases and accordingly the intensity of a magnetic field is substantially weakened. Thus, for the magnetic head 131 to smoothly detect the magnetic field, a flying on demand (FOD) voltage is applied to the magnetic head 131 as a means for appropriately controlling the FH of the magnetic head 131.

The magnetic head 131 is generally formed of a metal alloy that is called as permalloy including Ni and Fe as main ingredients. Thus, when an FOD voltage is applied to the magnetic head 131 formed of permalloy metal alloy, a portion around a pole tip of the magnetic head 131 protrudes due to a difference in thermal expansion coefficients of metal components forming each part of the magnetic head 131, which is called as thermal pole tip protrusion (TPTP). Thus, the FH of the magnetic head 131 decreases. In contrast, when the FOD voltage being applied to the magnetic head 131 is decreased or removed, the pole tip of the magnetic head 131 that has protruded is thermally contracted and thus the FH of the magnetic head 131 is increased. The present invention adopts and further develops this principle so that, as the controller 170 appropriately controls the FOD voltage applied to the magnetic head 131 as described later, the recording and reproduction ability of the magnetic head 131 is improved while the collision between the magnetic head 131 and the surface of the disk 110 is prevented. One method of controlling the FOD voltage in this regard will be described later.

The slider 132 physically supports the magnetic head 131 and simultaneously makes the magnetic head 131 located at an accurate position when the magnetic head 131 floats over the surface of the disk 110. To provide such a function, the slider 132 preferably has a streamlined shape such as a sled to use a lift force generated by the rotation of the disk 110.

The suspension 133 connects the slider 132 and the actuator arm 134 as described later and elastically supports the slider 132 toward the surface of the disk 110. Thus, the suspension 133 prevents the collision between the magnetic head 131 and the surface of the disk 110 because the magnetic head 131 becomes too close to the surface of the disk 110, or the deterioration of the recording and reproduction ability of the magnetic head 131 because the magnetic head 131 becomes too far from the surface of the disk 110, as the slider 132 moves in a large amplitude by a fine vibration occurring to the HDD 100.

The actuator arm 134 has one end connected to the suspension 133 and the other end coupled to the pivot shaft 130a capable of relatively rotating. The actuator arm 134 extends to a sufficient length, such that the magnetic head 131 freely moves over the surface of the disk 110.

The actuator 135 makes the actuator arm 134 rotate around the pivot shaft 130a. The actuator 135 includes a voice coil (not shown) and a magnet (not shown). The actuator 135 makes the actuator arm 134 pivot in a direction following the Fleming's left hand rule under the influence of an electromagnetic force generated due to the interaction between a magnetic force generated by the magnet and current flowing in the voice coil. The controller 170 controls the electromagnetic force to move the magnetic head 131 in a desired direction on the disk 110.

Although the actuator 135 is shown as a voice coil motor (VCM) in FIG. 2, the scope of the present invention is not limited thereto and the actuator 135 may be, for example, a stepper motor which rotates by a predetermined angle according to an input signal. However, when the actuator 135 is the VCM, the VCM has the advantages of resisting thermal effects, not needing periodic formatting, and superior reliability.

The controller 170 controls the mechanical and electrical operations of the HDD 100. It may be implemented using a conventional digital signal processor (DSP), a microprocessor, and a microcontroller, a recording medium recording software, and/or firmware executing the method for controlling an FOD voltage, as will be described later.

The controller 170, as shown in FIG. 2, controls (decreases or increases) the rotational angular speed of the spindle motor 120 by inputting a control signal to the spindle motor 120, controls the VCM 135 to move the magnetic head 131 to a designated data sector, controls the magnetic head 131 to reproduce data from the disk 110 or record data on the disk 110, and controls the FOD voltage applied to the magnetic head 131 to improve the recording and reproduction ability of the magnetic head 131 and simultaneously prevent the collision between the magnetic head 131 and the surface of the disk 110. The controller will be described in some additional detail with a drive circuit of the HDD 100 according to an embodiment of the present invention.

As shown in FIG. 2, the HDD 100 according to an embodiment of the invention includes a pre-amplifier 171, a read/write channel 172, a host interface 173, a shock sensor 174, a VCM driver 136, a spindle motor (SPM) driver 122, and the controller 170 controlling the above elements.

The pre-amplifier 171 amplifies a data signal that the magnetic head 131 reproduced from the disk 110, or recording current converted by the read/write channel 172, and records the amplified signal and current on the disk 110 through the magnetic head 131. Also, the pre-amplifier 171 adjusts the FOD voltage applied to the magnetic head 131 by receiving the control signal of the controller 170.

The read/write (R/W) channel 172 converts the signal amplified by the pre-amplifier 171 to a digital signal and transmits the converted signal to a host device (not shown) through the host interface 173, or converts data input by a user and received through the host interface 173 to a binary data stream that is easy to record and inputs the converted data to the pre-amplifier 171.

The host interface 173 transmits the data converted to a digital signal to the host device or receives the data input by the user from the host device and inputs the data to the read/write channel 172 through the controller 170. The shock sensor 174 detects a shock when the shock occurs to the HDD 100 and inputs a signal indicating the occurrence of a shock to the controller 170.

The VCM driver 136 controls the amount of current applied to the VCM 135 by receiving the control signal of the controller 170. The SPM driver 122 controls the amount of current applied to the spindle motor 120 by receiving the control signal of the controller 170.

The controller 170 included in the HDD 100 according to the present embodiment controls the functions of reproducing data from the disk 110 or recording data to the disk 110, controlling the VCM 135 to move the magnetic head 131 to a desired position on the disk 110, controlling the spindle motor 135 to control the rotational speed of the disk 110, and controlling the FOD voltage applied to the magnetic head 131 to thermally expand an end of the magnetic head 131.

The functions of reproducing data from the disk 110 and recording data to the disk 110 are respectively accomplished in a data read mode and a data write mode. In the data read mode, a data signal that the magnetic head 131 reads from the disk 110 is amplified by the pre-amplifier 171, converted to a digital signal by the read/write channel 172, and transmitted to the host interface 172 through the controller 170 to be output to the host device.

In the write mode, the user input data input from the host device and received by the host interface 173 is input to the read/write channel 172 through the controller 170, converted to the binary data stream that is easy to record, amplified to recording current by the pre-amplifier 171, and recorded on the disk 110 by the magnetic head 131.

The function of controlling the VCM 135 to move the magnetic head to a desired position on the disk 110 is implemented by the controller 170, the VCM driver 136 adjusting the amount of current applied to the VCM by receiving the control signal of the controller 170, and the VCM 135 driven by the VCM driver 136. The VCM driver 136 in response to the control signal of the controller 170 adjusts the amount of the current applied to the voice coil to adjust the rotational force generated by the interaction between the current flowing in the voice coil and the magnetic force of the magnet. The rotational force of the VCM 135 drives the actuator arm 134 to pivot so that the magnetic head 131 is moved to a desired position on the disk 110.

The function of controlling the spindle motor 120 to adjust the rotational speed of the disk 110 is embodied by the controller 170, the SPM driver 122 adjusting the amount of current applied to the spindle motor 120 by receiving the control signal of the controller 170, and the spindle motor 120 driven by the SPM driver 122. The SPM driver 122 in response to the control signal of the controller 170 adjusts the rotational speed of the spindle motor 120 by adjusting the amount of current applied to the spindle motor 120. Thus, the rotational speed of the disk 110 connected to the spindle motor 120 is adjusted.

The function of controlling the FOD voltage which is applied to the magnetic head 131 to thermally expand one end of the magnetic head 131 is embodied by the shock sensor 174 detecting a shock occurring to the HDD 100, the controller 170 receiving a shock detecting signal from the shock sensor 174 and transmitting an FOD voltage control command signal to the pre-amplifier 171, and the pre-amplifier adjusting the FOD voltage applied to the magnetic head 131 according to the command signal of the controller 170. However, although the pre-amplifier 171 and the controller 170 are connected directly and the pre-amplifier 171 directly receiving the control signal from the controller 170 adjusts the FOD voltage applied to the magnetic head 131 in FIG. 2, it is possible that the pre-amplifier 171 and the controller 170 are indirectly connected via the read/write channel 172 so that the pre-amplifier 171 indirectly receives the control signal of the controller 170 through the read/write channel 172 and adjusts the FOD voltage applied to the magnetic head 131.

A method of controlling the FOD voltage applied to the magnetic head 131 may be implemented by software executable by the controller 170 in conjunction with other software resources (e.g., an operating system) and/or related firmware.

Figure 3:
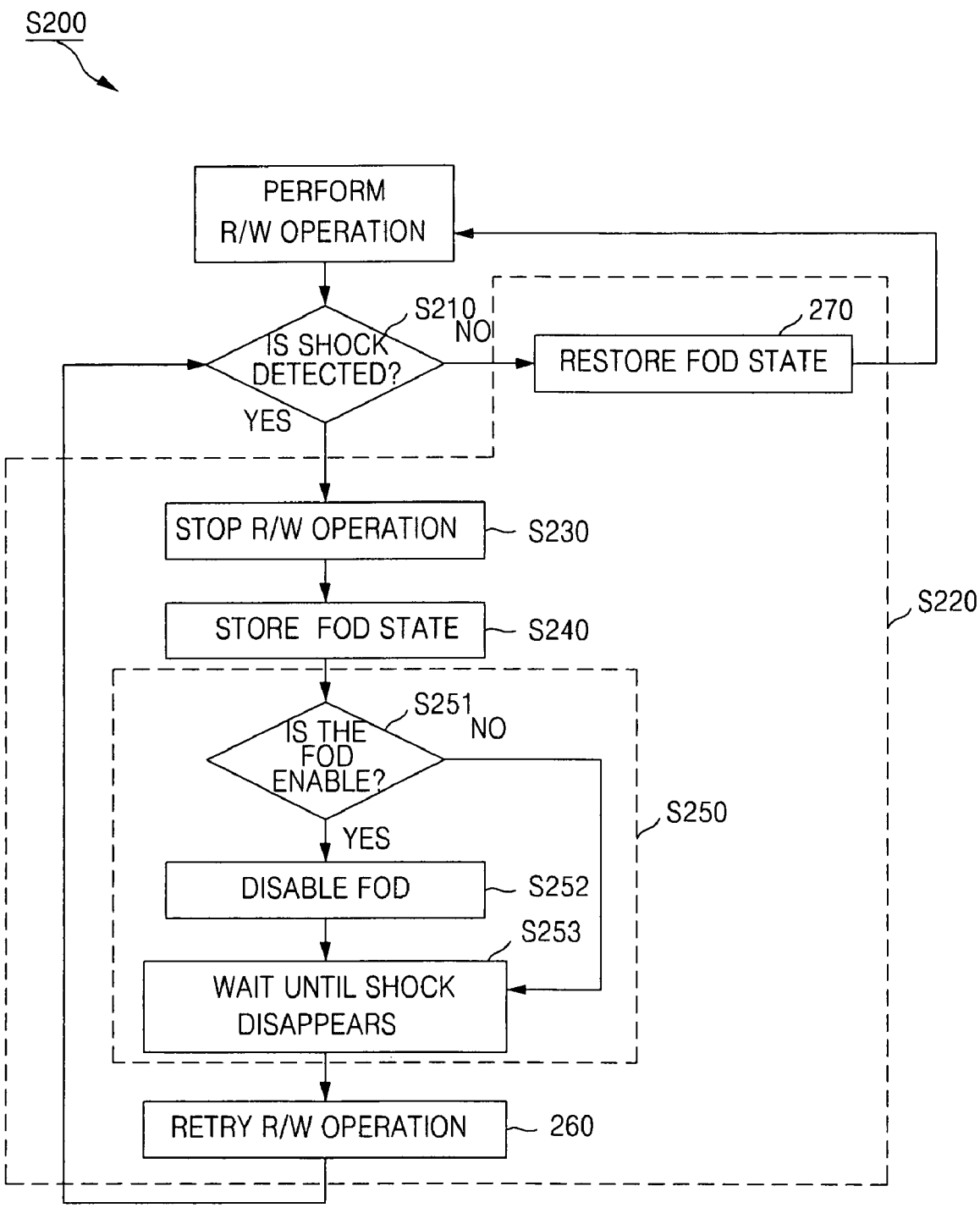
FIG. 3 is a flow chart for explaining the FOD voltage control method of the hard disk drive of FIG. 1.

FIG. 3 is a flow chart for illustrating an exemplary FOD voltage control method applicable to an embodiment of the invention, such as the HDD of FIG. 1. As shown in FIG. 3, a method for controlling an FOD voltage of an HDD according to an embodiment of the present invention includes detecting a shock occurring to the HDD 100 where the magnetic head 131 is mounted (S210) and controlling the FOD voltage applied to the magnetic head 131 when the shock is detected (S220).

In the operation of detecting a shock (S210), a shock occurring to the HDD 100 is detected using the shock sensor 174 that is generally used. The shock occurring to the HDD 100 is not limited to a strong stimulus caused by a collision as defined by a dictionary, but has a wide meaning, for example, vibrations and shakiness inevitably generated in an environment in which the HDD 100 is used.

In this case, considering the purpose of the present invention to prevent the collision between the magnetic head 131 and the surface of the disk 110, it is preferred to install the shock sensor 174 close to the magnetic head 131 or the surface of the disk 110. However, since the recording and reproduction performance of the magnetic head 131 may be affected by the shock sensor 174, it is more preferred that the shock sensor 174 be installed on the PCB.

In the operation of controlling the FOD voltage (S220), when the shock sensor 174 detects a shock, by reducing or removing the FOD voltage applied to the magnetic head 131, the pole tip of the magnetic head 131 that has thermally expanded is thermally contracted. Accordingly, the FH of the magnetic head 131 is increased so that the possibility of the collision between the magnetic head 131 and the surface of the disk 110 is reduced.

The operation of controlling the FOD voltage (S220) includes storing a value of the FOD voltage applied to the magnetic head 131 (S240), reducing or removing the FOD voltage applied to the magnetic head 131 (S250), and reapplying an FOD voltage corresponding to the stored voltage value after the shock ends (or ends) (S270). That is, by storing in advance the value of the FOD voltage that is applied to the magnetic head 131 when the shock occurs, after the shock ends, the operational state of the magnetic head 131 is restored to the state before the shock occurs. Thus, since the original state is restored within a short time after the shock ends, the performance of the HDD 100 is improved. The phrase "shock ends" recognizes that the application of an external mechanical shock to an HDD is a highly transient event having a finite period of incidence. The end or ending of a shock period may be variously determined within embodiments of the invention.

The operation of reducing or removing the FOD voltage applied to the magnetic head 131 (S250) includes distinguishing whether the FOD voltage is applied to the magnetic head 131 (S251), if the FOD voltage is not applied to the magnetic head 131 (NO), maintaining the state in which the FOD voltage is not applied until the shock ends and waiting for the disappearance of the shock (S253), if the FOD voltage is applied to the magnetic head 131 (YES), controlling the FOD voltage applied to the magnetic head 131 (S252) and waiting for the disappearance of the shock (S253). That is, the states of the FOD voltage not being applied to the magnetic head 131 (NO) and being applied to the magnetic head 131 (YES) are checked and, when the FOD voltage is not applied (NO), the disappearance of the shock is waited for in a state that the FOD voltage is not continuously applied (S253). When the FOD voltage is applied (YES), after the FOD voltage is controlled (S252) and the disappearance of the shock is waited for (S253). In this case, the control of the FOD voltage (S252) substantially signifies reducing or completely removing of the FOD voltage.

Preferably, the method further includes the operations of stopping the operation of the magnetic head 131 when a shock is detected (S230), before the operation of storing the value of the FOD voltage applied to the magnetic head 131 (S240), and retrying the operation of the magnetic head 131 after the shock ends (S260), before the operation of re-applying the FOD voltage corresponding to the stored voltage value to the magnetic head 131 (S270). That is, when the shock sensor 174 detects a shock, to prevent the collision between the magnetic head 131 and the surface of the disk 110 by increasing the FH of the magnetic head 131 with respect to the disk 110, the operation of the magnetic head 131 is primarily stopped (S230), the value of the FOD voltage applied to the magnetic head 131 is stored (S240), the FOD voltage is reduced or removed (S250), the operation of the magnetic head 131 is retried after the shock ends (S26), and the FOD voltage corresponding to the stored voltage value is reapplied to the magnetic head 131 (S270). Thus, any damage to the magnetic head 131 and/or the surface of the disk 110 caused by the collision between the magnetic head 131 and the surface of the disk 110 can be prevented in advance. In this case, the operation of the magnetic head 131 may be a data read operation and/or a data write operation.

In the operational principle of the FOD voltage controlling method according to the present embodiment, when the magnetic head 131 performs the reproduction of data recorded on the disk 110 (or the recording of data on the disk 110), when a shock occurs to the HDD 100, the shock sensor 174 arranged on the PCB of the HDD 110 detects the shock (S210).

The shock sensor 174 detecting the shock transmits a shock detection signal to the controller 170. The controller 170 transmits a command signal to reduce or remove the FOD voltage to the pre-amplifier 171. In this case, as mentioned above, the controller 170 can directly reduce or remove the FOD voltage without using the pre-amplifier 171.

The controller 170 stops the data reproduction operation of the magnetic head 131 (S230). The value of the FOD voltage applied to the magnetic head 131 is stored (S240). Whether the FOD voltage is applied to the magnetic head 131, that is, the value of the FOD voltage is "0", is distinguished (S251). When the FOD voltage is applied to the magnetic head 131 (YES), the pole tip of the magnetic head 131 thermally expands so that the distance between the magnetic head 131 and the surface of the disk 110 decreases, that is, the FH of the magnetic head 131 decreases. Thus, when a shock occurs to the HDD 100, the magnetic head 131 and the surface of the disk 110 are highly likely to collide with each other.

Thus, when the FOD voltage is applied to the magnetic head 131, that is, the value of the FOD voltage is not "0", the FOD voltage applied to the magnetic head 131 is reduced or removed (S252) and the pole tip of the magnetic head 131 is thermally contracted. Accordingly, the distance between the magnetic head 131 and the surface of the disk 110 increases and the disappearance of the shock is waited for (S253).

When the FOD voltage is not applied to the magnetic head 131 (NO), the distance between the magnetic head 131 and the surface of the disk 110 is relatively great, that is, the FH of the magnetic head 131 increases. Thus, even when a shock occurs to the HDD 100, the possibility of the collision between the magnetic head 131 and the surface of the disk 110 becomes low.

Consequently, when the FOD voltage is not applied to the magnetic head 131, that is, the value of the FOD voltage is "0", the current state in which the FOD voltage is not applied to the magnetic head 131 is maintained until the shock ends and the disappearance of the shock is waited for (S253).

After the shock ends, the controller 170 retries the data reproduction operation of the magnetic head 131 (S260) and applies the FOD voltage corresponding to the stored voltage value to the magnetic head 131 (S270). Of course, when the FOD voltage has not been applied to the magnetic head 131 (NO), since the value of the FOD voltage has been "0", the value of the FOD voltage reapplied to the magnetic head 131 is "0".

According to the method for controlling an FOD voltage of a hard disk drive according to an embodiment of the present invention (S200), since the FOD voltage is applied to the magnetic head 131 to lower the FH of the magnetic head 131, the recording and reproduction ability of the magnetic head 131 are improved. Also, when a shock occurs to the HDD 100, since the FH of the magnetic head 131 is increased by reducing or removing the FOD voltage, the possibility of the collision between the magnetic head 131 and the surface of the disk 110 can be reduced.

In the above-described embodiment, when a shock occurs to an HDD, although the FOD voltage applied to the magnetic head 131 is reduced or removed by the controller 170 that is embodied by software (S200), the above operation can be embodied by hardware using the input and output of electric signals. That is, as shown in FIG. 2, when a shock occurs to the HDD 100, the shock sensor 174 detects the shock and transmits an electric signal indicating that the shock is detected to the controller 170. The controller 170 stops the recording and/or reproduction operations of the magnetic head 131 based on the input electric signal and simultaneously transmits an input signal indicating that the FOD voltage be removed in synchronism with the signal to the pre-amplifier 171. Then, the pre-amplifier 171 receives the input signal and instantly removes the FOD voltage applied to the magnetic head 131.

As described above, when the method is embodied only by hardware using the input and output of electric signals, not based on additional software, when a shock occurs to the HDD 100, a response speed to remove the FOD voltage from the magnetic head 131 in response to the shock becomes faster. Thus, when a shock occurs to the HDD 100, damage to the magnetic head 131 and/or the surface of the disk 110 can be certainly prevented.

According to the above-described embodiments of the present invention, the recording and reproduction capabilities associated with an HDD magnetic head are improved by applying an FOD voltage to the magnetic head. Also, potential damage to the magnetic head and/or the surface of the disk can be prevented by detecting an externally applied shock to the HDD and reducing or removing the FOD voltage in relation thereto.

Although several embodiments of the invention have been shown and described above, the present invention is not limited to only the described embodiments. Instead, it will be appreciated by those skilled in the art that various changes may be made to these embodiments without departing from the scope of the invention as defined by the following claims and their equivalents.

What is claimed is:

1. A method for controlling a Flying On Demand (FOD) voltage within a hard disk drive (HDD) comprising a disk and a magnetic head that records data on or reproduces data from the disk, the method comprising:
   detecting a shock applied to the HDD; and
   upon detecting the shock, controlling the FOD voltage applied to the magnetic head to thermally expand one end of the magnetic head,
   wherein controlling of the FOD voltage comprises:
      storing a value of the FOD voltage applied to the magnetic head; and
      after the shock ends, reapplying the FOD voltage corresponding to the stored value of the FOD voltage.

2. The method of claim 1, wherein the controlling of the FOD voltage comprises:
   distinguishing whether the FOD voltage is applied to the magnetic head; and
   if the FOD voltage is not applied to the magnetic head, waiting until the shock ends while maintaining the state of the FOD voltage; and
   if the FOD voltage is applied to the magnetic head, controlling the FOD voltage applied to the magnetic head and waiting until the shock ends.

3. The method of claim 2, wherein controlling the FOD voltage applied to the magnetic head comprises removing the FOD voltage applied to the magnetic head.

4. The method of claim 2, further comprising:
   stopping operation of the magnetic head when the shock is detected; and
   after the shock ends, retrying operation of the magnetic head before reapplying the FOD voltage corresponding to the stored value of the FOD voltage.

5. The method of claim 4, wherein the operation of the magnetic head is a data reproduction operation.

6. The method of claim 4, wherein the operation of the magnetic head is a data recording operation.

7. A computer readable recording medium recording a method for controlling a Flying On Demand (FOD) voltage within a hard disk drive (HDD), the HDD comprising a disk and a magnetic head that records data on or reproduces data from the disk, and the method comprises:
   detecting a shock applied to the HDD, and
   upon detecting the shock, controlling the FOD voltage applied to the magnetic head to thermally expand one end of the magnetic head,
   wherein controlling of the FOD voltage comprises:
      storing a value of the FOD voltage applied to the magnetic head; and
      after the shock ends, reapplying the FOD voltage corresponding to the stored value of the FOD voltage.

8. A hard disk drive (HDD) comprising:
   at least one disk;
   a magnetic head recording data on the at least one disk or reproducing data from the at least one disk and having one end that thermally expands in relation to an applied Flying On Demand (FOD) voltage;
   a shock sensor detecting an external shock applied to the HDD; and
   a controller controlling the FOD voltage in response to a detected shock,
   wherein upon shock detection, the controller stores a value of the FOD voltage applied to the magnetic head, controls the FOD voltage applied to the magnetic head, and reapplies the FOD voltage corresponding to the stored value of the FOD voltage to the magnetic head after the shock ends.

9. The hard disk drive of claim 8, wherein the controller distinguishes whether the FOD voltage is applied to the magnetic head; and
   if the FOD voltage is not applied to the magnetic head, the controller waits for the shock to end while maintaining the state of the FOD voltage; and
   if the FOD voltage is applied to the magnetic head, the controller controls the FOD voltage applied to the magnetic head and waits for the shock to end.

10. The hard disk drive of claim 9, wherein the controller controls the FOD voltage applied to the magnetic head by removing the FOD voltage.

11. The hard disk drive of claim 10, wherein
   upon shock detection, the controller stops operation of the magnetic head, stores a value of the FOD voltage applied to the magnetic head, retries the operation of the magnetic head after the shock ends, and reapplies the FOD voltage corresponding to the stored value of the FOD voltage to the magnetic head.

12. The hard disk drive of claim 11, wherein the operation of the magnetic head is a data reproduction operation.

13. The hard disk drive of claim 11, wherein the operation of the magnetic head is a data recording operation.

14. The hard disk drive of claim 8, wherein the shock sensor is mounted on a printed circuit board including the controller.

15. A hard disk drive (HDD), comprising:
   at least one disk;
   a magnetic head recording data on the at least one disk or reproducing data from the at least one disk and having one end that thermally expands as a Flying On Demand (FOD) voltage is applied;
   a shock sensor detecting an external shock applied to the HDD;
   a controller generating a signal for removing the FOD voltage when the shock sensor detects the shock; and
   a pre-amplifier receiving the signal for removing the FOD voltage from the controller and removing the FOD voltage applied to the magnetic head,
   wherein when the shock sensor detects the shock, the controller generates a stop signal stopping operation of the magnetic head and the signal for removing the FOD voltage in synchronous with the stop signal.

* * * * *